United States Patent Office 2,857,422
Patented Oct. 21, 1958

2,857,422

PRODUCTION OF CARBONYL-SUBSTITUTED ETHANOL ESTERS

Rudolph F. Fischer, Oakland, Calif., and Curtis W. Smith, Greenwich, Conn., assignors to Shell Development Company, New York, N. Y., a corporation of Delaware No Drawing. Application July 16, 1956
Serial No. 597,838

13 Claims. (Cl. 260—488)

This invention relates to the production of carboxylic acid esters of ethanols having a carbonyl carbon atom as substituent on the beta-carbon atom. More particularly, the present invention relates to an improved method for carrying out the addition of carboxylic acids to the aldehyde and ketones having a vinyl group ($-CH=CH_2$) directly attached to their carbonyl carbon atom to form substituted esters of the foregoing type.

The reaction on which the new process of the invention is based can be represented by the equation:

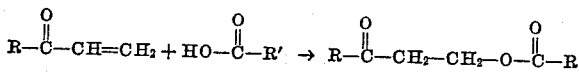

wherein R and R' represent hydrogen atoms or hydrocarbon radicals. When R is hydrogen the starting vinyl compound will be acrolein while it will be a vinyl ketone when R is hydrocarbon.

This reaction has been described in Ballard-Geyer-Mortimer patent—U. S. 2,467,876 as the first step in an advantageous method of converting acrolein to acrylic acid. Ballard-Geyer patent—U. S. 2,638,479 describes and claims the best method heretofore known for carrying out the reaction for the production of esters of beta-hydroxyaldehydes. The best results according to the method of this patent are a yield of beta-acetoxypropionaldehyde of about 80% based on the acrolein consumed at an acrolein conversion of about 29%. These results were obtained by non-catalytic reaction at high temperature under superatmospheric pressure using a large excess of acid.

An important object of the present invention is the provision of a process whereby the yield and conversion of vinyl carbonyl hydrocarbons to esters by addition of carboxylic acid can be improved over the results of prior methods of reaction. A specific object is to provide a method of adding carboxylic acids to acrolein in which substantially quantitative yields of beta-acyloxypropionaldehydes can be obtained. A further object is to provide a new method of producing esters of beta-keto-substituted ethanols from vinyl ketones. Still other objects and advantages of the process of the invention will be apparent from the following description.

It has been found unexpectedly that anion exchange resins are particularly advantageous catalysts for the addition of carboxylic acids, as a class, to the ethylenic double bond of vinyl carbonyl hydrocarbons to produce carboxylic acid esters of the corresponding beta-carbonyl-substituted ethanols, that is esters of ethyl alcohols having a formyl group or a keto group directly linked to the beta-carbon atom by a carbonyl carbon atom. This is quite unexpected since these resins have essentially no catalytic effect in promoting addition of carboxylic acids to other alpha,beta-ethylenic carbonyl compounds. Thus in the reaction of aldehydes or ketones having a substituted vinyl group linked to the carbonyl carbon atom, such, for example, as crotonaldehyde, methacrolein, methyl isopropenyl ketone, mesityl oxide, etc. or of alpha, beta-ethylenic carboxylic acid esters such as methyl acrylate and the like with carboxylic acids anion exchange resins are without effect. This unexpected selectivity of the basic ionic exchange resin catalysts makes them advantageous in the separation of carbonyl hydrocarbons having an unsubstituted vinyl group directly attached to the carbonyl carbon atom from other types of ethylenic compounds as will be described more fully hereinafter.

The new process of the invention thus comprises as an essential feature contacting a vinyl carbonyl hydrocarbon with a carboxylic acid in the presence of a basic anion exchange resin to produce the carboxylic acid ester of the beta-carbonyl-substituted ethanol corresponding to the said vinyl carbonyl hydrocarbon. The reaction can be represented by the following general equation:

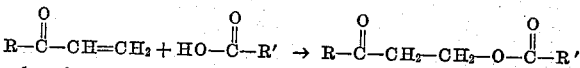

wherein

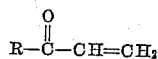

represents the vinyl carbonyl hydrocarbon being reacted and

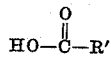

is the carboxylic acid being added thereto.

An important advantage of the new process of this invention is that while the desired reaction occurs on a basic surface, the product is not subjected to basic conditions so the undesirable base-catalyzed reactions, such as condensation, to which aldehydes and ketones are particularly prone, are avoided and excellent yields, which are generally substantially quantitative, are readily obtained.

A wide variety of different types of basic anion exchange resins can be used as the catalysts for the reaction. Amine-type resins are a particularly suitable type of catalyst for the new process. Advantageous catalysts of this kind are, for instance, furfuraldehyde-meta-phenylene-diamine resins, formaldehyde-aminoethylene-urea resins, polyaminostyrolene resins, etc., and especially those whose amino-groups have been rendered tertiary or quaternary by a suitable treatment, for example, by methylation by methyl sulfate. Quaternary ammonium anion exchange resins described in U. S. Patent 2,591,573 are effective in the new process when applied in their hydroxide or carboxylic acid salt forms. These and other strongly basic ion exchange resins which are effective catalysts in the new process, such, for instance, as the insoluble condensates from urea and/or melamine, formaldehyde and guanidine, are described in U. S. Patent 2,661,354. The anion exchange resins derived from thiophene as disclosed in U. S. Patent 2,585,652, are another type of resin which can be used as catalyst. Numerous suitable resins are commercially available under trade names, some representative examples being Amberlite IRA 400, a strongly basic amine type, sold by Rohm and Haas; Dowex 1, a quaternary amine type, sold by Dow Chemical Co.; Nalcite SAR, an amine type derived from polystyrene cross-linked with divinyl benzene, sold by National Aluminate Corporation; and Permutit S, a strongly basic amine type sold by the Permutit Company.

The anion exchange catalyst is advantageously used in the form of an insoluble resin, preferably in granular form with or without a support or carrier such, for instance, as described in U. S. Patent 2,497,067. While the catalyst used can be anion exchange resin initially in the hydroxide form, it is rapidly converted to the salt of the carboxylic acid which is being employed in the reaction and it has been found advantageous, as a general rule, to pretreat the catalyst with the carboxylic acid being reacted to form such salt before carrying out the reaction with the vinyl carbonyl hydrocarbon.

The reaction can be carried out batchwise, intermittently or continuously. One advantageous method of batchwise reaction comprises suspending the chosen anion exchange resin in a mixture of the vinyl carbonyl hydrocarbon and carboxylic acid to be reacted and agitating the mixture to maintain intimate contact of the reactions with the catalyst. The quantity of anion exchange resin used in this modification of the invention can be varied over a considerable range. As little as about 1% or as much as 200% or more based on the weight of the reactants can be used although amounts of the order of about 25% to about 50% are usually preferred. After a suitable reaction period which may advantageously be about 2 to about 48 hours, depending on the temperature, the agitation can be discontinued and the catalyst separated by settling and decantation, or filtration or centrifuging, for example. The ester of the carbonyl-substituted ethanol produced is then recovered from the reaction mixture. The catalyst can be reused repeatedly and has been found to have a long effective life in the process. Should it become contaminated and lose activity it can be readily regenerated by treatment with an alkali or ammonium hydroxide solution.

For continuous reaction the anion exchange resin catalyst is advantageously used as bed of the solid granular catalyst through which a mixture of the vinyl carbonyl hydrocarbon and carboxylic acid reactants are fed at a rate controlled so as to provide sufficient time of contact with the catalyst to achieve the desired conversion. As a rule it is preferable to feed the reactants, separately or premixed, into the top of a tower packed with catalyst of particle size between about 10 and about 40 mesh, while withdrawing reacted mixture from the bottom of the tower for recovery of the carbonyl-substituted ethanol ester product. However, it is feasible to operate with the reverse direction of flow in the catalyst tower.

It is an advantage of the new process that the reaction can be carried out at low temperatures. This not only saves the cost of heating but also favors higher conversions to the desired ester products since the equilibrium shifts in favor of ester formation as the temperature is reduced. On the other hand, the rate of reaction decreases with decreasing temperature so it is generally preferable to use temperatures in the range of about 10° to about 40° C. Higher or lower temperatures can, however, be used although it is generally desirable not to use temperatures above 100° C. unless the catalyst is deposited on a supporting material resistant to such temperatures since there is a tendency for the anion exchange resins to become brittle and crumble if maintained at such elevated temperatures for extended periods of time. At temperatures below about 0° C. the reaction becomes too slow for most practical operations.

The mole ratio of carboxylic acid to vinyl carbonyl hydrocarbon in the reaction mixture can be varied. An excess of one of the reactants can be used to shift the equilibrium in favor of the desired beta-carbonyl-substituted ethanol ester. However, an excess greater than a mole ratio of about 10:1 reduces plant capacity without giving compensating advantages so is generally less desirable and mole ratios of the reactants of about 1:1 to about 6:1 are preferred. When reacting acrolein it is usually advantageous to use about the stoichiometric proportion of carboxylic acid since the volume of recycle to the reaction is minimized with such a feed. With vinyl ketones where the equilibrium is less favorable to beta-carbonyl-substituted ethanol ester formation there is advantage in using an excess of one of the reactants in the reaction mixture. Usually an excess of carboxylic acid is preferred when reacting with mixtures in other than stoichiometric proportions, but an excess of vinyl carbonyl hydrocarbon can also be employed.

The reaction can be conducted at atmospheric, or elevated or reduced pressure. More usually it will be found advantageous to operate at a pressure at which the reactants are at least partly in the liquid phase. Liquid phase operation under substantially anhydrous conditions, that is less than 10% water in the mixture, have generally been found to be suitable. Where the reactants are mutally miscible under the chosen reaction conditions, it is only necessary to contact them with the anion exchange resin catalyst under such conditions. Where they have insufficient mutual solubility under the reaction conditions an inert organic solvent can be used to form the homogeneous mixture which is preferred for liquid phase operation. Suitable inert solvents include, for example, saturated hydrocarbons, aromatic hydrocarbons, for instance, benzene, toluene, etc., halogenated hydrocarbons which may be either saturated or aromatic, as chloroform, carbon tetrachloride, monochlorobenzene, and the like, ethers such as ethyl ether, for instance, esters of which ethyl acetate is typical, and like solvents which are inert with respect to both reactants and the reaction product under the reaction conditions. Because of the highly specific nature of the new catalysts for the reaction it is feasible to use non-vinylic ketones as solvents for the reactions although as a general rule their higher price makes them less preferred solvents.

The invention is further illustrated by the following examples showing some of its application and advantages.

*Example I.*—Production of beta-acetoxypropionaldehyde

A cylindrical glass reaction column 65 centimeters long by 4.2 centimeters inside diameter equipped with a fritted glass bottom plate was charged to within 5 centimeters of the top with a catalyst prepared by soaking Rohm and Haas "Amberlite IRA 400" anion exchange resin overnight in 10% aqueous sodium hydroxide solution, draining off the solution, water washing until the washings were neutral and then washing with acetic acid. Acrolein of 96% purity containing 2.5% water and acetic acid in equal mole proportions were then fed to the column at room temperature and reacted for various periods of contact as shown in the following table together with the results of reaction at 40° C. carried out in the same way in a similar column having a vapor jacket heated with methylene chloride.

| Contact Time (Hours) | Temperature | Parts by Weight of Reaction Mixture Fed | Parts by Weight of Beta-Acetoxypropionaldehyde, Recovered | Conversion to Beta-Acetoxypropionaldehyde, percent of Theoretical |
|---|---|---|---|---|
| 1 | Room | 238 | 23 | 9.6 |
| 5.5 | do | 168 | 46 | 27.3 |
| 16 | do | 250 | 101.5 | 40.6 |
| 48 | do | 251 | 117 | 46.5 |
| 113 | do | 254 | 118 | 46.5 |
| 2.5 | 40° C | 146 | 47 | 32 |
| 4 | 40° C | 197 | 69 | 35 |
| 16 | 40° C | 160 | 58 | 36 |

The effluents in each case were distilled from a Claisen still at 10 mm. pressure and the beta-acetoxypropionaldehyde was recovered as the fraction boiling 65°–70° C. after taking off unreacted acrolein and acetic acid. The residues were less than 1% of the kettle charge, giving a yield of 99% of the theoretical in each case. A typical analysis of the products was as follows:

|  | Calculated for $C_5H_8O_3$ | Found |
|---|---|---|
| Carbon | 51.7 | 50.4 |
| Hydrogen | 6.9 | 7.0 |
| Carbonyl Value, eq./100 grams | 0.862 | 0.909 |

The 2,4-dinitrophenylhydrazone of the beta-acetoxypropionaldehyde had a melting point of 126° C. and analyzed as follows:

|  | Calculated for $C_{11}H_{12}N_4O_6$ | Found |
|---|---|---|
| Carbon | 44.7 | 44.7 |
| Hydrogen | 4.1 | 4.2 |
| Nitrogen | 18.9 | 19.1 |

By using a 2:1 mole ratio of acetic acid to acrolein in the feed the equilibrium conversions to beta-acetoxypropionaldehyde are as follows:

| | Percent |
|---|---|
| Room temperature | 58 |
| 40° C | 43 |

The yield in these cases also is 99% of the theoretical when using the foregoing method of reaction.

*Example II.—Production of 1-acetoxy-3-butanone*

Using the reaction method of Example I methyl vinyl ketone was reacted with acetic acid employing a mole ratio of methyl vinyl ketone to acetic acid of 1:1 and a reaction time of 16 hours at 25° C. The yield of 1-acetoxy-3-butanone was substantially quantitative at a conversion of methyl vinyl ketone of 13%. The recovered 1-acetoxy-3-butanone had a boiling point of 93–95° C. at 20 mm. Hg and a refractive index, $n\ 20/D\ 1.4206$. It analyzed as follows:

|  | Calculated for $C_6H_{10}O_3$ | Found |
|---|---|---|
| Carbon | 55.3 | 55.5 |
| Hydrogen | 7.7 | 7.8 |
| Sapon Value, eq./100 grams | 0.77 | 0.77 |
| Carbonyl Value, eq./100 grams | 0.77 | 0.76 |

*Example III*

*Production of beta-benzoxypropionaldehyde*

By substituting benzoic acid for the acetic acid in the process of Example I, equally good yields of beta-benzoxypropionaldehyde are obtained at a mole ratio of acid to acrolein of 2:1 when reacting at room temperature.

It will be understood that the above examples are merely illustrative and that the present invention broadly comprises contacting a vinyl carbonyl hydrocarbon, that is a carbonyl-substituted hydrocarbon having a vinyl group ($H_2C=CH-$) directly linked to the carbonyl carbon atom, and a carboxylic acid in the presence of an anion exchange resin whereby the ester of said carboxylic acid and the beta-carbonyl-substituted ethanol corresponding to said vinyl carbonyl hydrocarbon is formed.

The invention is applicable to vinyl carbonyl hydrocarbons generally. Specific vinyl carbonyl hydrocarbons, other than those used in the examples, well adapted for use in the process, include ethyl vinyl ketone, isopropyl vinyl ketone, tertiary butyl vinyl ketone, neopentyl vinyl ketone, n-hexyl vinyl ketone, isooctyl vinyl ketone, divinyl ketone, allyl vinyl ketone, phenyl vinyl ketone, p-tert. butyl phenyl vinyl ketone, and cyclohexyl vinyl ketone. Vinyl carbonyl hydrocarbons which have 3 to 9 carbon atoms are especially advantageous in the process of this invention.

In addition to the specific carboxylic acids mentioned in the examples, other aliphatic, aromatic and cycloaliphatic carboxylic acids can be used successfully in the process. Specific examples of such acids include the saturated aliphatic acids: formic acid, propionic acid, lactic acid, isobutyric acid, lauric acid, and stearic acid; the unsaturated acids: acrylic acid, crotonic acid, methacrylic acid, oleic acid, ricinoleic acid, and linoleic acid; the aromatic acids: toluic acid, cinnamic acid, chlorobenzoic acid, and phenylacetic acid; and the alicyclic carboxylic acids: cyclohexanecarboxylic acid, cyclopentanecarboxylic acid, dimethylcyclohexanecarboxylic acid, cyclohexenecarboxylic acid and cyclohexylacetic acid. Polycarboxylic acids which can be used include oxalic acid, dimethylmalonic acid, adipic acid, and citric acid. In general the best results have been obtained with unsubstituted monocarboxylic acids having 1 to 8 carbon atoms per molecule and the lower aliphatic monocarboxylic acids have been found to be especially advantageous.

When using polyethylenic vinyl carbonyl compounds as starting materials, the addition of carboxylic acid takes place only at the double bond of the vinyl group and the product is an ethylenic ester. Thus in the reaction of formic acid with allyl vinyl ketone the product is 1-formoxyhexen-5-one-3. In the case of divinyl ketone some addition of carboxylic acids usually takes place at both of the vinyl groups even when low ratios of acid to ketone are used. With higher ratios of acid substantially complete reaction at both vinyl groups is obtained. Thus when reacting acetic acid and divinyl ketone in equimolecular proportions using "Permutit S" as the anion exchange resin catalyst, the product is chiefly 1-acetoxypenten-4-one-3 with a smaller amount of 1,5-diacetoxypentanone-3 while with a 5:1 ratio of acetic acid and a longer reaction time 1,5-diacetoxypentanone-3 is substantially the sole product of the addition. With dicarboxylic acids as reactants products of addition of two moles of vinyl carbonyl compound to the same acid can be obtained. For example, in reacting oxalic acid with acrolein using "Amberlite IRA 400" as the catalyst the ester obtained is a mixture of the mono-addition product, mono-(beta-hydroxypropionaldehyde) oxalate

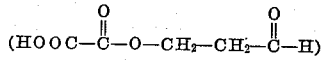

and the diaddition product, bis-(beta-hydroxypropionaldehyde) oxalate

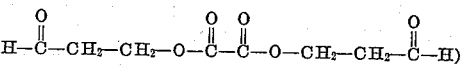

unless a very large excess of one or the other of the reactants is used. Thus in reacting 45 grams (0.5 mole) oxalic acid and 112 grams (2.0 moles) acrolein at room temperature by the method of Example I, there were obtained 130 grams of a mixture of mono- and di-(beta-hydroxypropionaldehyde) oxalates analyzing as follows:

|  | Calculated for the Mono-oxalate $C_5H_6O_5$ | Calculated for the Di-oxalate $C_8H_{10}O_6$ | Found |
|---|---|---|---|
| Carbon | 41.1 | 47.5 | 46.7 |
| Hydrogen | 4.1 | 5.0 | 5.6 |
| Acidity, eq./100 grams | 0.69 | 0 | 0.20 |
| Ester Value, eq./100 grams | 0.69 | 0.99 | 0.87 |
| Carbonyl Value, eq./100 grams | 0.69 | 0 | 0.29 |

An especially advantageous application of the process of this invention is in the preparation of esters of otherwise difficultly esterifiable acids, particularly acids having sterically hindered carboxyl groups. Formation of esters according to the process of the invention apparently does not involve attack on the carbonyl of the carboxylic acid, as do ordinary esterifications, but gives good yields of esters with sterically hindered acids. Thus durene dicarboxylic acid which gives negligibly low yields of ester by ordinary esterification methods was found to be readily esterified by reaction with acrolein using the process of Example I at room temperature, a mole ratio of durene dicarboxylic acid to acrolein of 0.056:1, and a contact time of 26 hours, to obtain bis-(beta-hydroxypropionaldehyde) tetramethyl terephthalate as the chief product with a smaller amount of mono-(beta-hydroxypropionaldehyde) tetramethyl terephthalate.

As previously pointed out the new process of the invention is not only useful for the synthesis of the useful beta-carbonyl-substituted ethanol esters which it makes available economically and efficiently, but also as a method for separating vinyl carbonyl hydrocarbons from other compounds. The high selectivity of the addition of carboxylic acid to the vinyl group, particularly when the reaction is carried out at temperatures not higher than about 30° C., makes it feasible to form esters of the vinyl carbonyl hydrocarbons without substantial conversion of other ethylenic compounds present therewith. The esters can then be separated from the other components of the mixture by distillation and pyrolyzed by heating at about 160° to 200° C. under atmospheric pressure. Distillation of the products then gives the vinyl carbonyl hydrocarbon in a purified form. In this way methyl vinyl ketone can be separated from methyl acrylate, for example, and ethyl vinyl ketone can be separated from methyl propenyl ketone.

This purification method is also advantageous for the separation of other components otherwise difficult to remove from vinyl carbonyl hydrocarbons. Thus acrolein and methyl vinyl ketone form azeotropes with minor amounts of water which are extremely difficult to separate into their components by ordinary methods without considerable loss of starting aldehyde or ketone. As a result the drying of these compounds to the essentially anhydrous state necessary for certain of their applications has been quite expensive. It has been found that these compounds can be produced economically in an essentially dry form, i. e. less than 0.05% water, by reacting their azeotropes with acetic acid in the presence of a basic anion exchange resin as above described, separating the ester obtained from the unreacted components, pyrolyzing the ester and fractionating the products. Acrolein can be successfully purified of propionaldehyde and acetone impurities by similar reaction, the unreacted material from the esterification step being recycled until the content of impurities has built up to a high enough level to warrant their removal in a bleed stream.

It will thus be seen that the new process is capable of many applications. It is susceptible to considerable variation, not only in regard to the vinyl carbonyl hydrocarbons and carboxylic acids which can be reacted successfully but also in regard to the method and conditions of operation. The invention will therefore be recognized as not restricted to the procedures which have been given by way of illustration nor by any theory proposed in explanation of the advantageous results which are achieved.

We claim as our invention:

1. A process for producing carboxylic acid esters of beta-carbonyl-substituted ethanols, which comprises contacting a compound having the formula $$CH_2=CH-\overset{O}{\underset{\|}{C}}-R$$

wherein R is selected from the group consisting of hydrogen and hydrocarbyl radicals, and a hydrocarbyl carboxylic acid with a strongly basic anion exchange resin.

2. A process in accordance with claim 1 wherein the mixture is contacted with a strongly basic amine type resin at a temperature not greater than 100° C.

3. A process for producing a carboxylic acid ester of beta-hydroxypropionaldehyde, which comprises contacting acrolein and a hydrocarbyl carboxylic acid with a strongly basic ion exchange resin.

4. A process in accordance with claim 3 wherein an excess of carboxylic acid to acrolein is used in the reaction.

5. A process for preparing a beta-acyloxypropionaldehyde, which comprises contacting acrolein and a saturated aliphatic hydrocarbyl monocarboxylic acid containing from 1 to 8 carbon atoms with a strongly basic amine type resin at a temperature not greater than 100° C.

6. A process for producing a beta-acyloxypropionaldehyde, which comprises passing acrolein and an aliphatic hydrocarbyl monocarboxylic acid containing from 1 to 8 carbon atoms in the liquid phase through a bed of granular, strongly basic ion exchange resin, continuously withdrawing reacted mixture, and distilling off unreacted components from the ester formed.

7. A process in accordance with claim 6 wherein a stoichiometric excess of carboxylic acid to acrolein is fed to the catalyst bed maintained at a temperature not greater than 40° C.

8. A process for producing beta-acetoxypropionaldehyde which comprises contacting acrolein and acetic acid with a strongly basic amine type resin at a temperature not greater than 40° C.

9. A process for producing a beta-acyloxy ketone, which comprises reacting a vinyl hydrocarbyl ketone and an aliphatic hydrocarbyl monocarboxylic acid containing from 1 to 8 carbon atoms with a strongly basic ion exchange resin.

10. A process in accordance with claim 9 wherein a beta-acyloxyalkanone is produced by reacting a vinyl alkyl ketone with a lower, saturated fatty acid in contact with a strongly basic amine-type ion exchange resin.

11. A process for producing beta-acetoxyethyl methyl ketone which comprises contacting vinyl methyl ketone and acetic acid with a strongly basic ion exchange resin.

12. A process for separating compounds having the formula $$CH_2=CH-\overset{O}{\underset{\|}{C}}-R$$

wherein R is selected from the group consisting of hydrogen and hydrocarbyl radicals, from admixtures thereof with close boiling compounds which are free from vinyl groups attached to carbonyl carbon atoms, which comprises contacting said mixture with a hydrocarbyl monocarboxylic acid of the class consisting of the lower saturated aliphatic and lower aromatic hydrocarbyl monocarboxylic acids, in the presence of a strongly basic anion exchange resin at a temperature not higher than 40° C., separating the resulting beta-carbonyl-substituted ethanol ester from the reaction mixture, and pyrolyzing said ester.

13. A process for separating acrolein from its azeotrope with water, which comprises contacting said azeotrope with a lower saturated aliphatic monocarboxylic acid in the presence of a strongly basic anion exchange resin at a temperature not higher than 40° C., separating the resulting beta-acyloxypropionaldehyde from the water, and pyrolyzing the separated beta-acyloxypropionaldehyde to acrolein and acetic acid.

References Cited in the file of this patent

UNITED STATES PATENTS

| | | |
|---|---|---|
| 2,415,171 | Horeczy | Feb. 4, 1947 |
| 2,638,479 | Ballard et al. | May 12, 1953 |
| 2,678,332 | Cottle | May 11, 1954 |
| 2,774,792 | Carlson et al. | Dec. 18, 1956 |

OTHER REFERENCES

Corson et al.: J. Org. Chem. 21 (March 1956), 371-2.